(12) United States Patent
Howcroft et al.

(10) Patent No.: US 8,100,327 B2
(45) Date of Patent: Jan. 24, 2012

(54) SYSTEM AND METHOD OF VOTING VIA AN INTERACTIVE TELEVISION SYSTEM

(75) Inventors: Jerald Robert Howcroft, Beverly Hills, MI (US); Kathy Goode Piatt, Cedar Park, TX (US)

(73) Assignee: AT&T Intellectual Property, L.P., Atlanta, GA (US)

( * ) Notice: Subject to any disclaimer, the term of this patent is extended or adjusted under 35 U.S.C. 154(b) by 0 days.

(21) Appl. No.: 12/948,579

(22) Filed: Nov. 17, 2010

(65) Prior Publication Data

US 2011/0067042 A1  Mar. 17, 2011

Related U.S. Application Data

(63) Continuation of application No. 12/847,642, filed on Jul. 30, 2010, which is a continuation of application No. 11/517,939, filed on Sep. 8, 2006, now Pat. No. 7,789,305.

(51) Int. Cl.
G06F 17/60 (2006.01)
(52) U.S. Cl. ............... 235/386; 463/1; 700/91; 705/7; 705/10
(58) Field of Classification Search ................. 235/386; 700/91; 705/7, 10
See application file for complete search history.

(56) References Cited

U.S. PATENT DOCUMENTS

| | | | |
|---|---|---|---|
| 6,947,966 B1 * | 9/2005 | Oko et al. | 709/203 |
| 6,968,243 B1 | 11/2005 | Oh | |
| 2002/0107725 A1 * | 8/2002 | Hickey et al. | 705/12 |
| 2002/0162121 A1 | 10/2002 | Mitchell | |
| 2003/0066072 A1 | 4/2003 | Creed et al. | |
| 2003/0149616 A1 | 8/2003 | Travaille | |
| 2004/0031058 A1 * | 2/2004 | Reisman | 725/112 |
| 2005/0101307 A1 * | 5/2005 | Brugge et al. | 455/414.1 |
| 2006/0123454 A1 | 6/2006 | Popa | |
| 2006/0178193 A1 | 8/2006 | Hunter | |
| 2007/0167216 A1 | 7/2007 | Walker et al. | |
| 2008/0061142 A1 | 3/2008 | Howcroft et al. | |
| 2009/0177519 A1 | 7/2009 | Tota et al. | |
| 2009/0327161 A1 | 12/2009 | Horowitz | |

OTHER PUBLICATIONS

International Search Report and Written Opinion corresponding PCT Application No. PCT/US2007/016177 from the International Searching Authority mailed Mar. 4, 2008, 10 pp.
International Preliminary Report on Patentability corresponding PCT Application No. PCT/US2007/016177 from the International Bureau of WIPO mailed Mar. 19, 2009, 8 pp.
Non-Final Office Action for U.S. Appl. No. 11/517,939 mailed Jan. 20, 2010.

* cited by examiner

*Primary Examiner* — Allyson Trail
(74) *Attorney, Agent, or Firm* — Toler Law Group, PC

(57) ABSTRACT

A computer implemented method includes receiving, at a server of an internet protocol television (IPTV) network, a voting selection from a set-top box device. The voting selection is associated with video content that is received at the set-top box device via the IPTV network. The computer implemented method includes not adding the voting selection to a tally of votes associated with the video content when a voting status indicates that a previous vote was received from the set-top box device. The computer implemented method also includes sending a message to the set-top box device from the server, the message indicating that the previous vote associated with the video content was received from the set-top box device.

19 Claims, 7 Drawing Sheets

SYSTEM AND METHOD OF VOTING VIA AN INTERACTIVE TELEVISION SYSTEM

CLAIM OF PRIORITY

The present application is a continuation of and claims priority from U.S. patent application Ser. No. 12/847,642 filed on Jul. 30, 2010, which is a continuation of U.S. patent application Ser. No. 11/517,939 filed on Sep. 8, 2006, now issued as U.S. Pat. No. 7,789,305, the contents of both of which are expressly incorporated herein by reference in their entirety.

FIELD OF THE DISCLOSURE

The present disclosure relates generally to voting via an interactive television system.

BACKGROUND

Television viewing is part of daily life for many people. The wealth of content available from television service providers allows many people to find entertaining and informative programming despite their varying interests. Some television programs allow viewers to vote for various performers, polling options, and the like. Nonetheless, viewers typically have to vote by telephone or computing devices coupled to the Internet, particularly when payment is required in order to cast a vote.

DETAILED DESCRIPTION

In a particular embodiment, a computer implemented method includes receiving, at a server of an internet protocol television (IPTV) network, a voting selection from a set-top box device. The voting selection is associated with video content that is received at the set-top box device via the IPTV network. The computer implemented method includes not adding the voting selection to a tally of votes associated with the video content when a voting status indicates that a previous vote was received from the set-top box device. The computer implemented method also includes sending a message to the set-top box device from the server, the message indicating that the previous vote associated with the video content was received from the set-top box device.

In another particular embodiment, a set-top box device includes a processor and a memory device coupled to the processor. The processor is configured to receive data related to a voting interface from a server of an internet protocol television (IPTV) network. The processor is further configured to send the voting interface to a display device to receive user input from a remote control device associated with the set-top box device. The processor is further configured to send the user input to the server to cast a vote associated with video content that is received at the set top box device via the IPTV network.

In another particular embodiment, a server includes a processor and a non-transitory memory device that includes operational instructions that, when executed by the processor, cause the processor to receive a voting selection from a set-top box device. The voting selection is associated with video content received at the set-top box device via an IPTV network. The operational instructions are further executable by the processor to not add the voting selection to a tally of votes associated with the video content when a voting status indicates that a previous vote was received from the set-top box device. The operational instructions are further executable by the processor to send a message to the set-top box device, where the message indicates that the previous vote associated with the video content was received from the set-top box device.

Figure 1:
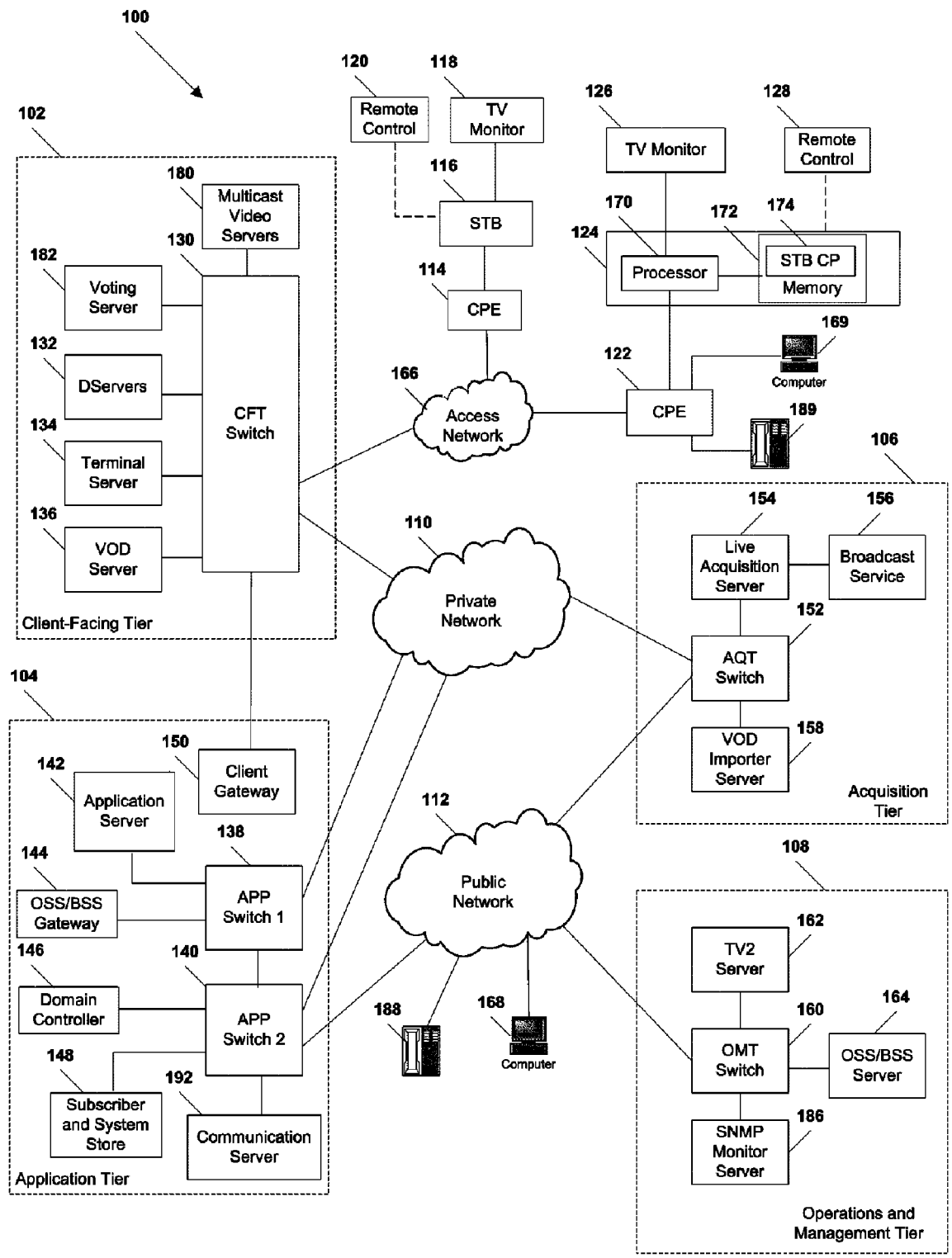
FIG. 1 is a block diagram of a particular illustrative embodiment of a system to vote via an interactive television system.

Referring to FIG. 1, an illustrative embodiment of an Internet Protocol Television (IPTV) system that may be used to vote is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

The client-facing tier 102 can communicate with user equipment via an access network 166, such as an Internet Protocol Television (IPTV) access network. In an illustrative embodiment, customer premises equipment (CPE) 114, 122 can be coupled to a local switch, router, or other device of the access network 166. The client-facing tier 102 can communicate with a first representative set-top box device 116 via the first CPE 114 and with a second representative set-top box device 124 via the second CPE 122. In a particular embodiment, the first representative set-top box device 116 and the first CPE 114 can be located at a first customer premise, and the second representative set-top box device 124 and the second CPE 122 can be located at a second customer premise. In another particular embodiment, the first representative set-top box device 116 and the second representative set-top box device 124 can be located at a single customer premise, both coupled to one of the CPE 114, 122. The CPE 114, 122 can include routers, local area network devices, modems, such as digital subscriber line (DSL) modems, any other suitable devices for facilitating communication between a set-top box device and the access network 166, or any combination thereof.

In an exemplary embodiment, the client-facing tier 102 can be coupled to the CPE 114, 122 via fiber optic cables. In another exemplary embodiment, the CPE 114, 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the access network 166, via an IPTV software platform, such as Microsoft® TV IPTV Edition.

The first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device 124 can communicate with a second remote control 128. The set-top box devices 116, 124 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 116, 124 can receive data, video, or any combination thereof, from the client-facing tier 102 via the access network 166 and render or display the data, video, or any combination thereof, at the display device 118, 126 to which it is coupled. In an illustrative embodiment, the set-top box devices 116, 124 can include tuners that receive and decode television programming signals or packet streams for transmission to the display devices 118, 126. Further, the set-top box devices 116, 124 can include a STB processor 170 and a STB memory device 172 that is accessible to the STB processor 170. In one embodiment, a computer program, such as the STB computer program 174, can be embedded within the STB memory device 172.

In an illustrative embodiment, the client-facing tier 102 can include a client-facing tier (CFT) switch 130 that manages communication between the client-facing tier 102 and the access network 166 and between the client-facing tier 102 and the private network 110. As illustrated, the CFT switch 130 is coupled to one or more data servers, such as D-servers 132, that store, format, encode, replicate, or otherwise manipulate or prepare video content for communication from the client-facing tier 102 to the set-top box devices 116, 124. The CFT switch 130 can also be coupled to a terminal server 134 that provides terminal devices with a connection point to the private network 110. In a particular embodiment, the CFT switch 130 can be coupled to a video-on-demand (VOD) server 136 that stores or provides VOD content imported by the IPTV system 100. Further, the CFT switch 130 is coupled to one or more multicast video servers 180 that receive video content and multicast the video content to the set-top boxes 116, 124 via the access network 166. In addition, the CFT switch 130 can be coupled to one or more voting servers 182 that provide one or more voting functions, such as selling, creating, storing, tallying, distributing, confirming, providing user interfaces, monitoring video content, or other functions related to voting.

In an illustrative embodiment, the client-facing tier 102 can communicate with a large number of set-top boxes, such as the representative set-top boxes 116, 124 over a wide geographic area, such as a metropolitan area, a viewing area, a statewide area, a regional area, a nationwide area or any other suitable geographic area, market area, or subscriber or customer group that can be supported by networking the client-facing tier 102 to numerous set-top box devices. In a particular embodiment, the CFT switch 130, or any portion thereof, can include a multicast router or switch that communicates with multiple set-top box devices via a multicast-enabled network.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116, 124 via the access network 166, which enable the set-top box devices 116, 124 to provide functions, such as interactive program guides, video gaming, display, messaging, processing of VOD material and other IPTV content, etc. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

The second APP switch 140 can be coupled to a domain controller 146 that provides Internet access, for example, to users at their computers 168 via the public network 112. For example, the domain controller 146 can provide remote Internet access to IPTV account information, e-mail, personalized Internet services, or other online services via the public network 112. In addition, the second APP switch 140 can be coupled to a subscriber and system store 148 that includes account information, such as account information that is associated with users who access the IPTV system 100 via the private network 110 or the public network 112. In an illustrative embodiment, the subscriber and system store 148 can store subscriber or customer data and create subscriber or customer profiles that are associated with IP addresses, stock-keeping unit (SKU) numbers, other identifiers, or any combination thereof, of corresponding set-top box devices 116, 124. In a particular embodiment, the second APP switch 140 can be coupled to a communication server 192 that can communicate with a user phone 188, such as a Voice-over Internet Protocol (VoIP) phone via the public network 112.

In a particular embodiment, the application tier 104 can include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto. In an illustrative embodiment, the set-top box devices 116, 124 can access the IPTV system 100 via the access network 166, using information received from the client gateway 150. User devices can access the client gateway 150 via the access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the access network 166.

For example, when the first representative set-top box device 116 accesses the client-facing tier 102 via the access network 166, the client gateway 150 can verify subscriber information by communicating with the subscriber and system store 148 via the private network 110. Further, the client gateway 150 can verify billing information and status by communicating with the OSS/BSS gateway 144 via the private network 110. In one embodiment, the OSS/BSS gateway 144 can transmit a query via the public network 112 to the OSS/BSS server 164. After the client gateway 150 confirms subscriber and/or billing information, the client gateway 150 can allow the set-top box device 116 to access IPTV content and VOD content at the client-facing tier 102. If the client gateway 150 cannot verify subscriber information for the set-top box device 116, e.g., because it is connected to an unauthorized twisted pair, the client gateway 150 can block transmissions to and from the set-top box device 116 beyond the access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television content, movie content, advertisement content, other video content, or any combination thereof, from a broadcast service 156, such as a satellite acquisition system or satellite head-end office. In a particular embodiment, the live acquisition server 154 can transmit content to the AQT switch 152, and the AQT switch 152 can transmit the content to the CFT switch 130 via the private network 110.

In an illustrative embodiment, content can be transmitted to the D-servers 132, where it can be encoded, formatted, stored, replicated, or otherwise manipulated and prepared for communication from the video server(s) 180 to the set-top box devices 116, 124. The CFT switch 130 can receive content from the video server(s) 180 and communicate the content to the CPE 114, 122 via the access network 166. The set-top box devices 116, 124 can receive the content via the CPE 114, 122, and can transmit the content to the television monitors 118, 126. In an illustrative embodiment, video or audio portions of the content can be streamed to the set-top box devices 116, 124.

Further, the AQT switch 152 can be coupled to a video-on-demand importer server 158 that receives and stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 116, 124, the requests can be transmitted over the access network 166 to the VOD server 136, via the CFT switch 130. Upon receiving such requests, the VOD server 136 can retrieve the requested VOD content and transmit the content to the set-top box devices 116,124 across the access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 186 that monitors network devices within or coupled to the IPTV system 100. In a particular embodiment, the OMT switch 160 can communicate with the AQT switch 152 via the public network 112.

In an illustrative embodiment, the live acquisition server 154 can transmit content to the AQT switch 152, and the AQT switch 152, in turn, can transmit the content to the OMT switch 160 via the public network 112. In this embodiment, the OMT switch 160 can transmit the content to the TV2 server 162 for display to users accessing the user interface at the TV2 server 162. For example, a user can access the TV2 server 162 using a personal computer 168 coupled to the public network 112.

Figure 5:
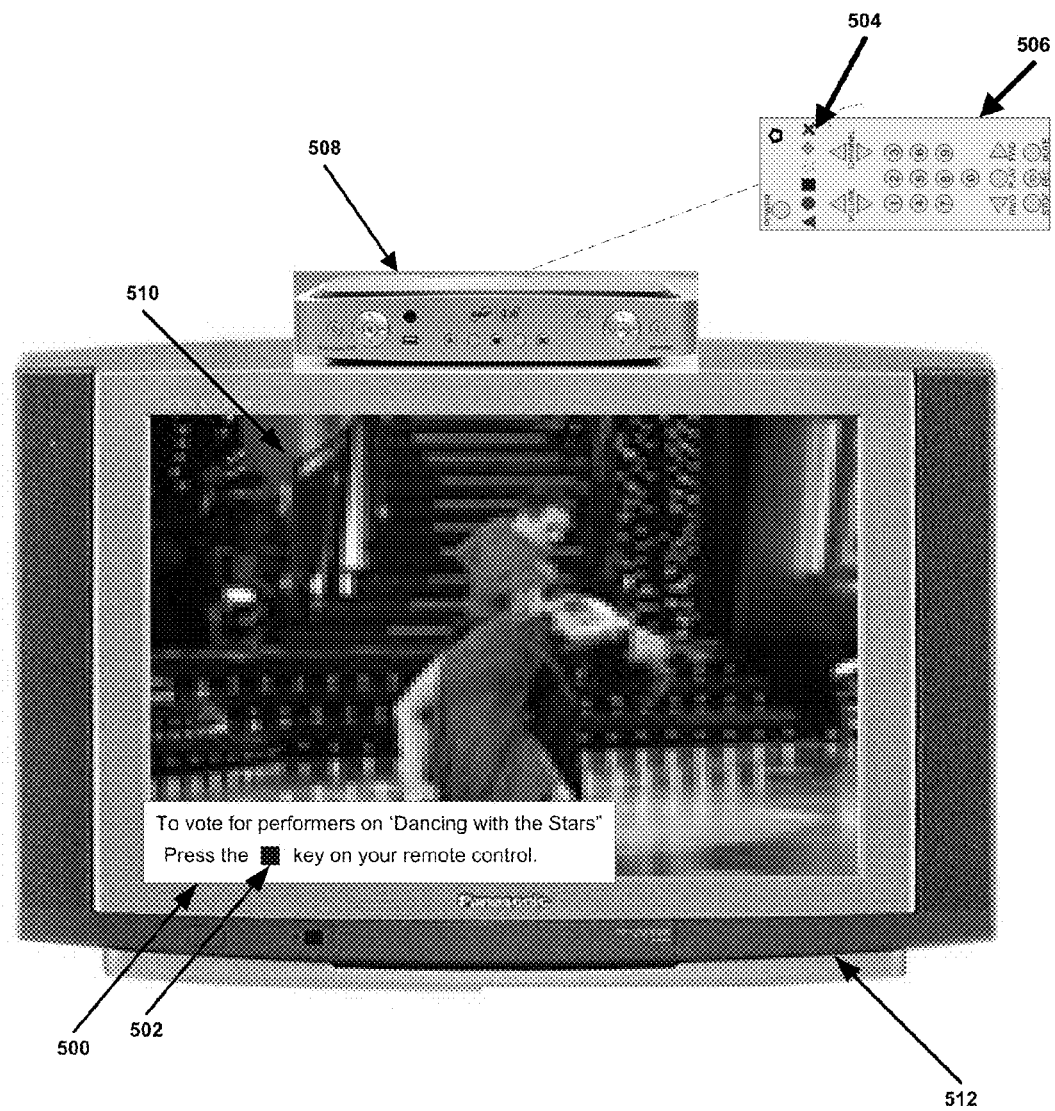
FIG. 5 is a diagram of a particular illustrative embodiment of a graphical user interface to vote via an interactive television system.

In a particular illustrative embodiment, one or more set-top box devices, such as the second representative set-top box device 124, can receive video content of a particular channel from one of the multicast video servers 180. In an illustrative embodiment, the video content can include Motion Picture Experts Group-4 (MPEG-4) channel content multicast to the set-top box device via a MPEG-2 transport stream. The voting server 182 can monitor the video content for triggers or other data indicating a voting event. When a voting event is indicated, the voting server 182 can send to the second representative set-top box device 124 an indicator of an option to cast a vote related to the video content, such as a talent competition, a news poll, or other video content. In a particular embodiment, the indicator can be a first graphical user interface (GUI), such as a voting indicator, that includes an instruction to press a particular key, or any key, on a remote control device in order to cast a vote related to the video content. In an illustrative embodiment, the indicator can be a pop-up interface. An example of a GUI to indicate an option to vote is illustrated in FIG. 5.

In a particular embodiment, a user can issue a command to the second set-top box device 124 indicating a selection to cast a vote related to the video content. In a particular embodiment, the command can be a selection of a particular key, or any key, on a remote control device communicating with the second representative set-top box device 124. In response to the command, the second representative set-top box device 124 can send a request to vote to the voting server 182. The voting server 182 can send to the second representative set-top box device 124 a voting interface, such as a second GUI, that includes one or more selectable voting options related to the video content. In one embodiment, the second GUI can include video content of a voting channel. In another embodiment, the second GUI can overlay video content to which voting is related. In an illustrative embodiment, the voting server can establish a secure connection, such as a secure socket layer connection, with the second representative set-top box device 124 prior to sending data related to the voting interface.

Figure 6:
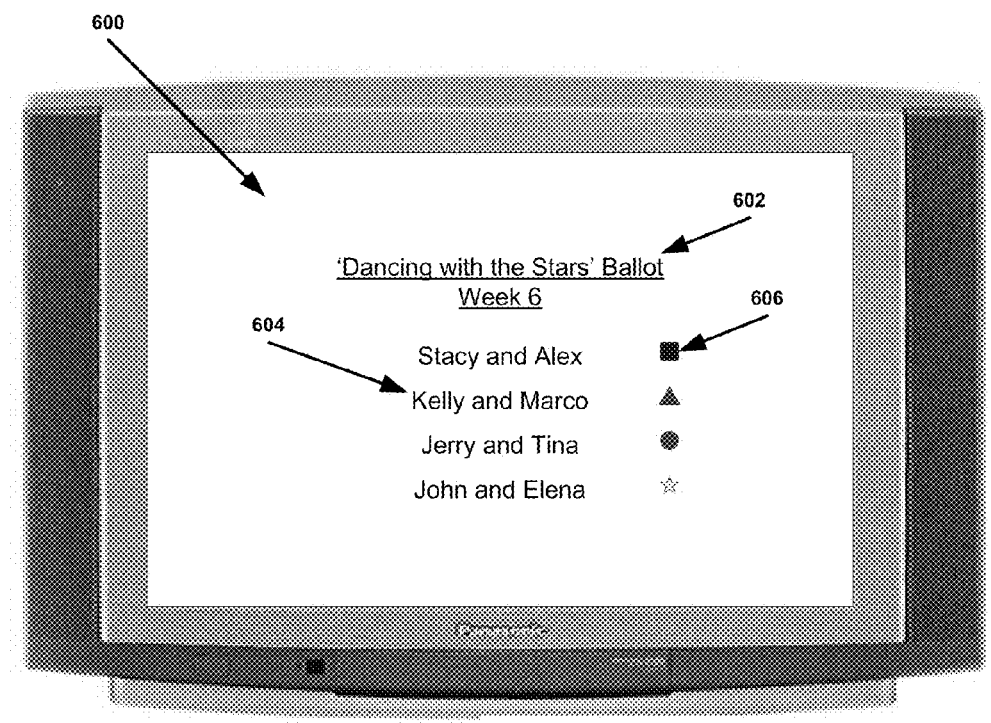
FIG. 6 is a diagram of a second particular illustrative embodiment of a graphical user interface to vote via an interactive television system.

For example, during a talent competition, a user may be presented with an option to vote for a particular performer after a particular performance. Thus, the voting interface would present a single voting option in response to a request to vote that is issued after a particular voting trigger. In another example, a user may be presented with an option to vote only after all performers have performed. Thus, the voting interface would present multiple voting options. The voting server 184 can store selectable voting options related to video content or data embedded in the video content, such as the data indicating a voting event, can include the selectable voting options related thereto. In an illustrative embodiment, the voting interface can be a ballot interface. An example of a voting interface is illustrated in FIG. 6.

In a particular embodiment, a user can enter a selection of a voting option via the voting interface at the second representative set-top box device 124, and the second representative set-top box device 124 can send the selection to the voting server 182. The voting server 182 can add the selection of the voting option to a tally of votes related to the video content.

In an illustrative embodiment, the voting server 182 can validate that a selection of an option to vote, a voting selection, or any combination thereof, has been issued by a set-top box device associated with a user of the IPTV system, for example, by prompting the user to enter an authentication token, by determining that the selection has been sent from an IP address associated with the set-top box device, or by other means of validating a source of the selection of the voting option. The voting server 182 can perform a validation process before sending the voting interface, before adding a voting selection to the tally of votes, or any combination thereof.

In another particular embodiment, the voting server 182 can determine a voting status of the second representative set-top box device 124 or a user associated therewith. For example, upon receiving a request to vote via the indicator of an option to vote, the voting server 182 can access a record of users, set-top box devices, or any combination thereof, which indicates whether a vote related to the video content has been received from the second representative set-top box device 124, from one or more particular users associated with the second representative set-top box device 124, or any combination thereof. If only one vote related to the video content may be cast by a user or at a set-top box device, and the voting server 182 determines that a voting selection related to the video content has been received from the second representative set-top box device 124 or a user logged on at the second representative set-top box device 124, the voting server 182 can refuse to send a voting interface to the second representative set-top box device 124, refuse to accept or tally any additional votes from the second representative set-top box device 124, or any combination thereof. Otherwise, the voting server 182 can accept a vote from the second representative set-top box device 124 and update one or more records to reflect that a vote has been received from the set-top box device, from a user logged on at a set-top box device, or any combination thereof. The voting server 182 can check a voting status of a set-top box, user, or any combination thereof, before sending an indicator of an option to vote, before sending a voting interface, before adding a voting selection to a tally of votes, or any combination thereof.

In a particular embodiment, the voting server 182 can determine whether payment is required in order to cast a vote related to the video content. For example, votes cast for a talent competition may cost $1.99 each. In an illustrative embodiment, data embedded within a stream of video data, such as the data indicating a voting event, can indicate that payment is required to vote. If the voting server 182 determines that payment is required to cast a vote related to video content, the voting server 182 can send to the second representative set-top box device 124 a payment interface, such as a third GUI, that allows a user to input payment information, such as a financial account number or other payment information. In an illustrative embodiment, the voting server 182 can be configured to require entry of valid payment information before sending a voting interface to the second representative set-top box device 124, before accepting or tallying votes from second representative set-top box device 124, or any combination thereof. Further, the voting server 182 can confirm payment information, for instance, by comparing payment information received via the payment interface with payment information stored at the OSS/BSS server 164, the subscriber and system store 148, a computing device of a credit provider or other financial institution, or any combination thereof.

In an illustrative embodiment, the voting server 182 can send a confirmation to the second representative set-top box device 124 indicating that a voting selection has been received at the voting server 182, that the voting selection has been added to the tally of votes, or any combination thereof. Further, in an illustrative non-limiting embodiment, the voting server 182 can send a confirmation to one or more computing devices, Voice-over Internet Protocol (VoIP) phones, or other devices associated with the second representative set-top box device 124. For instance, the voting server 182 can send a confirmation via the private network 110 to a user computing device 169, a VoIP phone 189, or any combination thereof, coupled to the second CPE 122. In another embodiment, the voting server 182 can send a confirmation to the domain controller 146 for communication to the user computing device 168 via the public network 110. In another example, the voting server 182 can send a confirmation to the communication server 192 for communication to the VoIP phone 188 via the public network 110.

In an illustrative embodiment, the voting server 182 can transfer voting selections, tallies of voting selections, or any combination thereof, to servers, data stores, or other devices within or outside of the IPTV system. For example, the voting server 182 can send tallies of votes to a data store or server associated with a television program, television channel, voting certification entity, or other party. In another example, the voting server 182 can store tallies of votes as customer-wide polls.

In a particular embodiment, the voting server 182 can separate each voting selection from information identifying a source of the voting selection, such as an identifier of a user or set-top box device, before tallying votes, before transferring tallies of votes, before determining a voting selection, or any combination thereof. For example, where a voting interface includes a plurality of selectable voting options, such as multiple performers, the voting server 182 can receive data related to the entire voting interface from the second representative set-top box device 124. After validating the source of the data, the voting server 182 can discard identifying information related to the source before determining which of the selectable voting options was selected.

Figure 2:
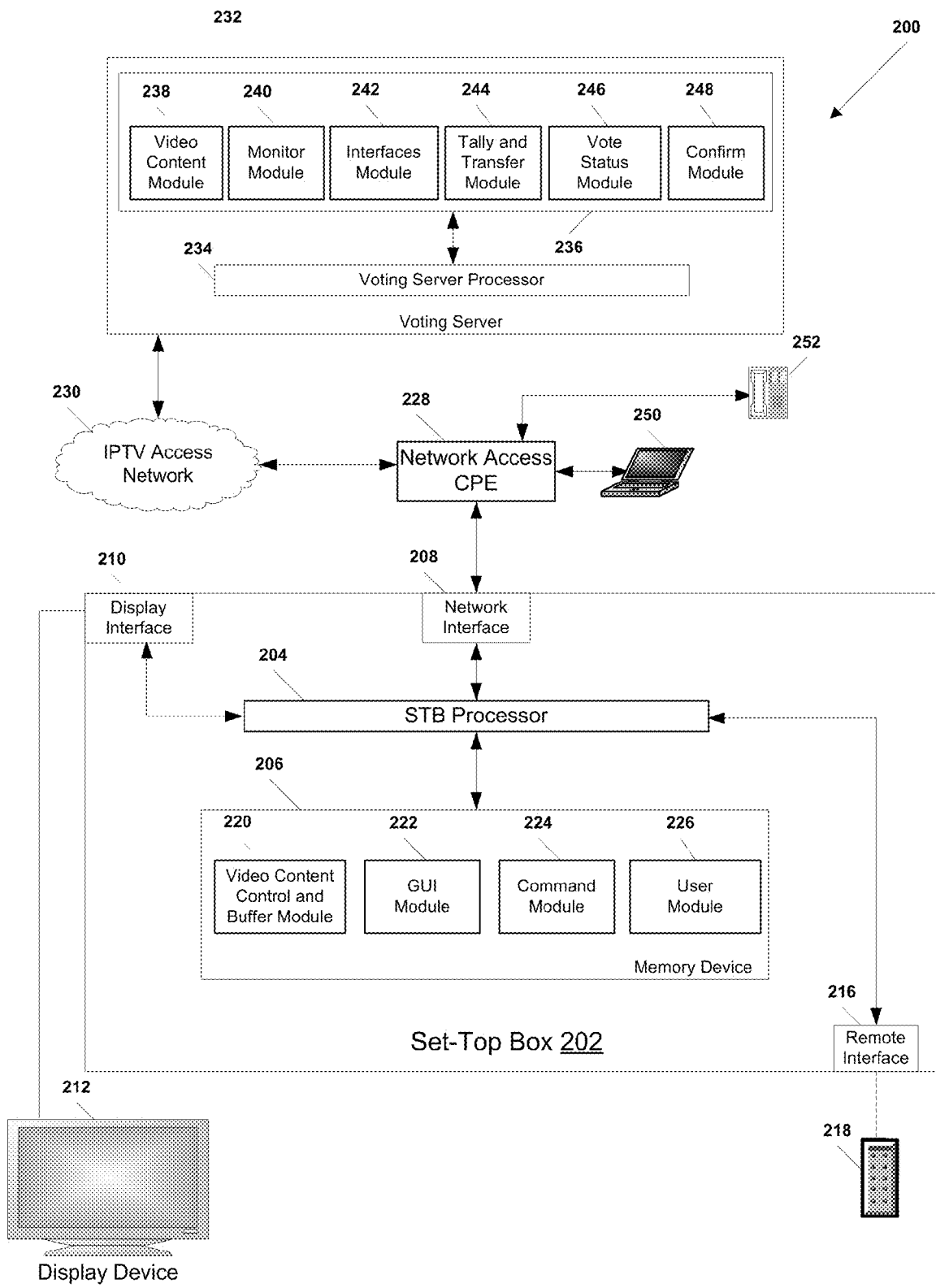
FIG. 2 is a block diagram of a second particular illustrative embodiment of a system to vote via an interactive television system.

Referring to FIG. 2, a second particular embodiment of a system to vote via an interactive television system is illustrated and designated generally at 200. The system 200 includes a set-top box device 202 that communicates with a voting server 232 of an Internet Protocol Television (IPTV) system via an IPTV access network 230.

As illustrated in FIG. 2, the set-top box device 202 includes a STB processor 204 and a memory device 206 accessible to the STB processor 204. In an illustrative, non-limiting embodiment, the STB processor 204 can communicate with the IPTV access network 230, via the network interface 208. In a particular embodiment, network access customer premises equipment (CPE) 228 can facilitate communication between the network interface 208 and the IPTV access network 230. The network access CPE 228 can include a router, a local area network device, a modem, such as a digital subscriber line (DSL) modem, any other suitable device for facilitating communication between the network interface 208 of the set-top box device 202 and the IPTV access network 230, or any combination thereof. Further, the STB processor 204 can communicate video content, graphical user interfaces, and other images and content to a display device 212 via a display interface 210. In addition, the STB processor 204 can receive commands from a remote control device 218 via a remote interface 216.

In a particular embodiment, the memory device 206 can include a video content control and buffer module 220 that is executable by the STB processor 204 to receive video content via the IPTV access network 230 and to buffer the video content before transmitting it to the display interface 210, in order to prevent underflow. The video content control and buffer module 220 can be executable by the STB processor 204 to communicate with the voting server 232, a video server, or any combination thereof, to receive video content to which one or more voting options are related, such as a talent competition or a polling program.

In a particular embodiment, the memory device 206 can include a graphical user interface (GUI) module 222 that is executable by the STB processor 204 to communicate with the voting server 232 to receive one or more graphical user interfaces associated with voting. For example, the GUI module can be executable by the processor 204 to communicate with the voting server 232 to receive a first GUI, such as a voting indicator, from the voting server 232 that includes an indication that a user may cast a vote related to video content. In an illustrative embodiment, the first GUI can include an instruction to select a particular key, or any key, on the remote control device 218 to indicate a desire to cast a vote related to the video content. In addition, the GUI module can be executable by the processor 204 to receive a first GUI from the voting server 232 that allows a user to input payment information that is sent by the set-top box device 202 to the voting server 232. Further, the GUI module can be executable by the processor 204 to receive a third GUI from the voting server 232 that allows a user to input a selection of one or more selectable voting options that is sent to the voting server 232. In an illustrative embodiment, the GUI module can be executable by the processor 204 to receive data related to one or more GUI's and to generate the GUI(s) based on the data. Moreover, the GUI module can be executable by the processor 204 to send the GUI's to the display device 212.

In a particular embodiment, the memory device 206 can include a command module 224 that is executable by the STB processor 204 to process commands received from the remote control device 218. For example, the command module 224 can be executable by the STB processor 204 to recognize the selection of a particular key of the remote control indicated in the first GUI as a command to indicate a desire to cast a vote related to video content. The command module 224 can be executable by the STB processor 204 to send a request to vote to the voting server 232 in response to a selection of the particular key. Further, the command module 224 can be executable by the STB processor 204 to process key selections received from the remote control device 218 in response to the second GUI and to send payment information indicated by the key selections to the voting server 232. In addition, the command module 224 can be executable by the STB processor 204 to process one or more key selections received from the remote control device 218 in response to the third GUI and to send a selection of a voting option indicated by the key selection(s) to the voting server 232. In another embodiment, the command module 224 can be executable by the STB processor 204 to send data related to an entire ballot to the voting server 232 after a voting selection has been received from a user via the remote control device 218.

In an illustrative, non-limiting embodiment, the memory device 206 can include a user module 226 that is executable by the STB processor 204 to receive login information from one or more users associated with the set-top box device 202. In a particular embodiment, data identifying a user logged in at the set-top box device 202 can be included with commands sent to the voting server 232.

In a particular embodiment, the voting server 232 can include a voting server processor 234. The voting server 232 can also include a voting server memory device 236 that is accessible to the voting server processor 234. In an illustrative, non-limiting embodiment, the voting server memory device 236 can include a video content module 238 that is executable by the voting server processor 234 to send video content to the set-top box device 202. Alternatively, a video server of the IPTV system can send the video content.

In a particular embodiment, the voting server memory device 236 can include a monitor module 240 that is executable by the voting server processor 234 to monitor video content sent to the set-top box device 202 for triggers or other data indicating a voting event. The voting server memory device 236 can include an interfaces module 242 that is executable by the voting server processor 234 to send data related to the first GUI to the set-top box device 202 when the voting server 232 identifies data indicating a voting event in the video content. Further, in an illustrative embodiment, the interfaces module 242 can be executable by the voting server processor 234 to determine whether payment is required to cast a vote related to the video content and to send data related to the second GUI to the set-top box device 202 when payment is required. The interfaces module 242 can also be executable by the voting server processor 234 to send data related to the third GUI to the set-top box device 202 in response to receiving data from the set-top box device 202 indicating a selection of an indicator in the first GUI; in response to receiving payment information from the set-top box device 202; in response to verifying such payment information; or any combination thereof. In addition, the interfaces module 242 can be executable by the voting server processor 234 to process commands, requests, instructions, or any combination thereof, related to one or more selections input by a user via the GUI's and sent by the set-top box device 202.

In a particular embodiment, the voting server memory device 236 can include a vote tally and transfer module 244 that is executable by the voting server processor 234 to add a voting selection received from the set-top box device 202 to a tally of votes associated with video content to which the voting selection relates. Further, the tally and transfer module 244 can be executable by the voting server processor 234 to store tallies of votes, to transfer tallies of votes to other devices within or outside of the IPTV system, or any combination thereof.

In a particular embodiment, the voting server memory device 236 can include a vote status module 246 that is executable by the voting server processor 234 to record whether the set-top box device 202 has or has not sent a voting selection related to particular video content to the voting server 232. Further, the vote status module 246 is executable by the voting server processor 234 to determine whether the set-top box device 202 has sent a voting selection related to the video content to the voting server 232 prior to sending a voting interface to the set-top box device 202, accepting a vote from the set-top box device 202, adding a vote received from the set-top box device to a tally of votes, or any combination thereof.

In a particular embodiment, the voting server memory device 236 can include a confirmation module 248 that is executable by the voting server processor 234 to send a confirmation to the set-top box device 202 after a voting selection is received, where the confirmation indicates that the voting selection has been received, has been added to a tally of votes, or any combination thereof. Further, in an illustrative embodiment, the confirmation module 248 can be executable by the voting server processor 234 to send a confirmation to a user computing device 250, a user Voice-over Internet Protocol (VoIP) phone 252, or any combination thereof.

In an illustrative embodiment, the various modules 220-226 and 238-248 can include logic, hardware, computer instructions, or any combination thereof.

Figure 3:
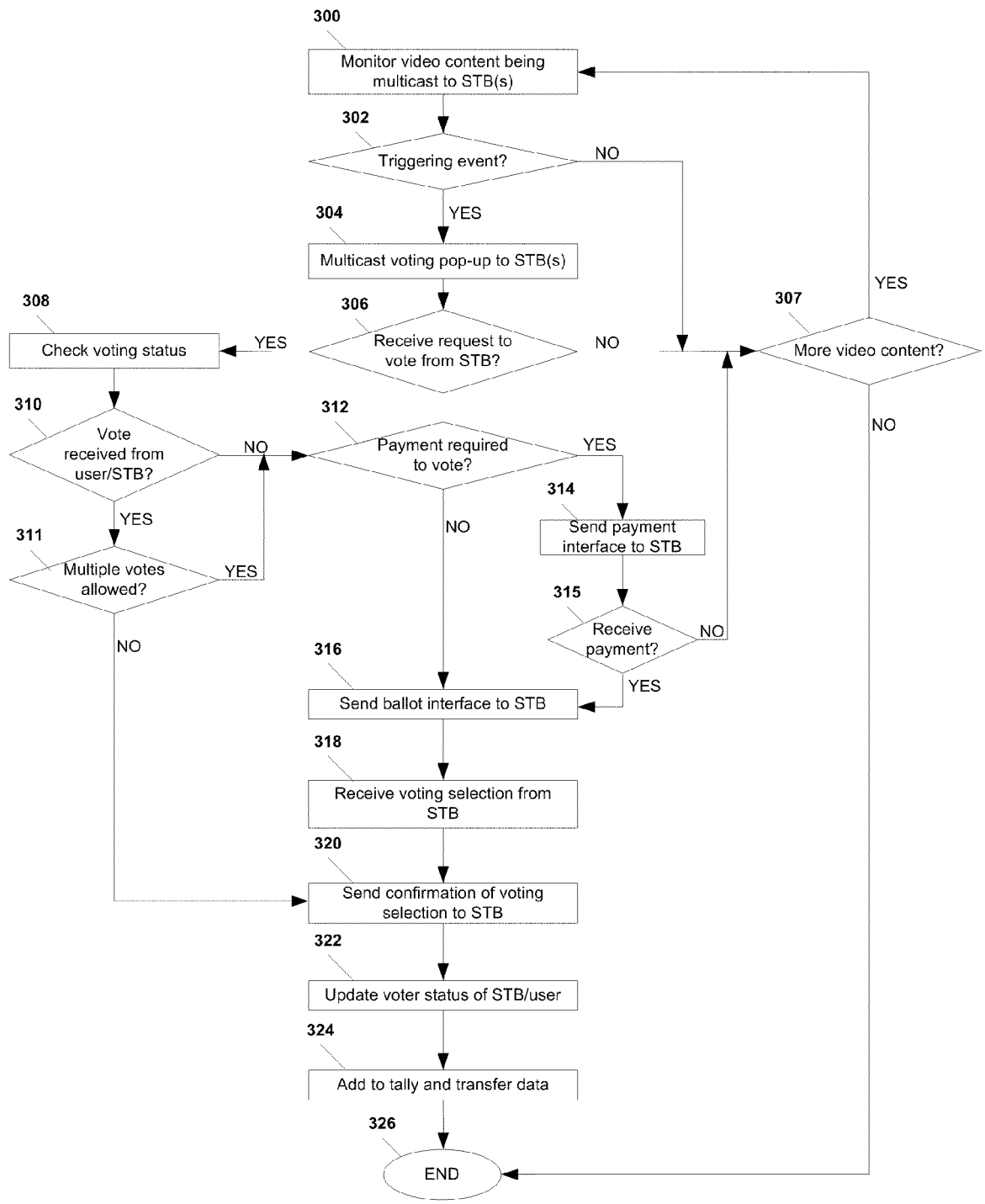
FIG. 3 is a flow diagram of a particular illustrative embodiment of a method of voting via an interactive television system.

Referring to FIG. 3, a particular illustrative embodiment of a method of voting via an interactive television system is illustrated. At block 300, a voting server of an Internet Protocol Television Protocol (IPTV) system monitors video content that is multicast to one or more set-top box devices via a private access network of the IPTV system. Moving to decision node 302, the voting server determines whether it identifies a triggering event in the video content, such as data indicating that votes may be cast related to the video content. In a particular embodiment, the voting server can identify a triggering event as it occurs in a stream of video data. In another particular embodiment, the voting server can look ahead in the stream of video data to recognize triggering events that will occur within a particular period of time, within a particular number or group of data packets, or any combination thereof. If the voting server does not recognize a triggering event in the video content, the method returns to block 300, and the voting server continues monitoring video content. Whereas, if the voting server recognizes a triggering event, the method proceeds to block 304.

Proceeding to block 304, in an illustrative embodiment, the voting server can multicast data related to a first graphical user interface (GUI), such as a pop-up interface, to the set-top box device(s) receiving the video content in which the triggering event has been recognized. Continuing to decision node 306, the voting server determines whether it has received a request to vote from a set-top box device in response to the first GUI. For instance, the voting server can receive a command, data, or instruction from a set-top box device indicating that a particular key of a remote control device has been selected, where the first GUI includes an instruction to select the particular key in order to cast a vote related to the video content. If the voting server determines that it has not received a request to vote from a set-top box device, the method moves to decision node 307, and the voting server determines whether there is more video content to be monitored. If the voting server determines that there is more video content, the method returns to block 300. Conversely, if the voting server determines that there is no more video content to be monitored, or no more of a particular video content to be monitored, the method terminates at 326.

Returning to decision node 306, in a particular embodiment, if the voting server determines that it has received a request to vote from a set-top box device, the method can proceed to block 308, and the voting server can check a voting status associated with the set-top box device. For example, the voting server can store one or more records that indicate whether a vote related to the video content has been received from the set-top box device, from a particular user logged in at a set-top box device, or any combination thereof. A voting status can indicate that a vote has been received, that a vote has not been received, that voting related to certain video content is prohibited, that voting via the set-top box device is prohibited, or other status types.

Advancing to decision node 310, in an illustrative embodiment, the voting server determines whether a vote related to the video content has already been received from the requesting set-top box device, a user of the set-top box device, or any combination thereof. If the voting server determines that a vote related to the video content has already been received from the requesting set-top box device, a user of the set-top box device, or any combination thereof, the method can proceed to decision node 311, and the voting server can determine whether multiple votes may be submitted by a single set-top box device, user, or any combination thereof. If multiple votes may be submitted, the method moves to decision node 312 and continues. On the other hand, if multiple votes may not be submitted, the method moves to block 320 and continues.

Returning to decision node 310, in a particular embodiment, if the voting server determines that it has not received a vote related to the video content from the requesting set-top box device, the method continues to decision node 312. At decision node 312, the voting server can determine whether payment is required to cast a vote related to the video content. For example, a talent competition can charge $1.99 per vote. In an illustrative embodiment, an indication that payment is, or is not, required to cast a vote can be included in data related to the triggering event or within other data of the video content. Alternatively, the voting server can store a list of video content or programs that require or do not require payment to cast a vote.

If the voting server determines that payment is not required to cast a vote related to the video content, the method advances to block 316. Whereas, if the voting server determines that payment is required to cast a vote, the method moves to block 314, and the voting server sends data related to a second GUI, such as a payment interface, to the set-top box device. In an illustrative embodiment, the voting server can open a secure socket layer (SSL), or other secure connection, with the set-top box device before sending the second GUI. A user can interact with the second GUI to input payment information, such as a financial account number, one or more authentication tokens, or any combination thereof. The method proceeds to decision step 315, and the voting server can determine whether payment information has been received. In an illustrative embodiment, the voting server can verify the payment information by comparing it to information stored at a billing server or a server of a credit lender or other financial institution. If the voting server determines that it has received payment information, the method can return to decision node 307. Conversely, if the voting server determines that it has received payment information, the method proceeds to block 316.

At block 316, the voting server send data related to a third GUI, such as a ballot interface, to the requesting set-top box device. In a particular embodiment, where multiple set-top box devices have requested to cast a vote related to the video content, the voting server can multicast the data related to the third GUI to the set-top box device. In an illustrative embodiment, the third GUI can include one or more selectable voting options, such as a single performer name, multiple performer names, a single polling option, multiple polling options (e.g., yes, no, more likely, less likely, for, against), or other selectable voting options. A user can interact with the third GUI, for example, via a remote control device communicating with the set-top box device to input a voting selection. At block 318, the voting server receives the voting selection from the set-top box device. In an illustrative embodiment, the voting server can validate a source of the voting selection to ensure that it came from the set-top box device and was not corrupted, altered, or intercepted en route to the voting server.

Proceeding to block 320, in a particular embodiment, the voting server can send a confirmation to the set-top box device from which a voting selection is received indicating that the voting selection was successfully received at the voting server. Moving to block 322, the voting server can update a voting status associated with the set-top box device, a user logged in at the set-top box device at the time a vote was received, or any combination thereof. Continuing to block 322, the voting server can add the voting selection to a tally of votes, which may include only a highest vote recipient, a range of voting recipients and their associated votes, or other distributions of votes and vote recipients. In an illustrative embodiment, the voting server can remove information identifying a set-top box device, a user, or any combination thereof, from each voting selection prior to adding the voting selection to the tally of votes. The method terminates at 326.

Returning to decision step 316, in an illustrative, non-limiting embodiment, if one or more newer or updated versions of the operating system, client software, or any combination thereof, are available, the method can move to block 318, and the application server can send, or instruct a video server or other server of the IPTV system to send, video content of an update ordering channel to the set-top box device. Continuing to block 320, the application server can receive an order, payment, or any combination thereof, for the set-top box update and can send updated versions of the operating system, client software, or any combination thereof, to the set-top box device. In a particular embodiment, the method can return to decision step 306 and continues as described. For example, and the application server can determine whether the set-top box device can support execution of the requested application as a result of the update. The method terminates at 324.

Figure 4:
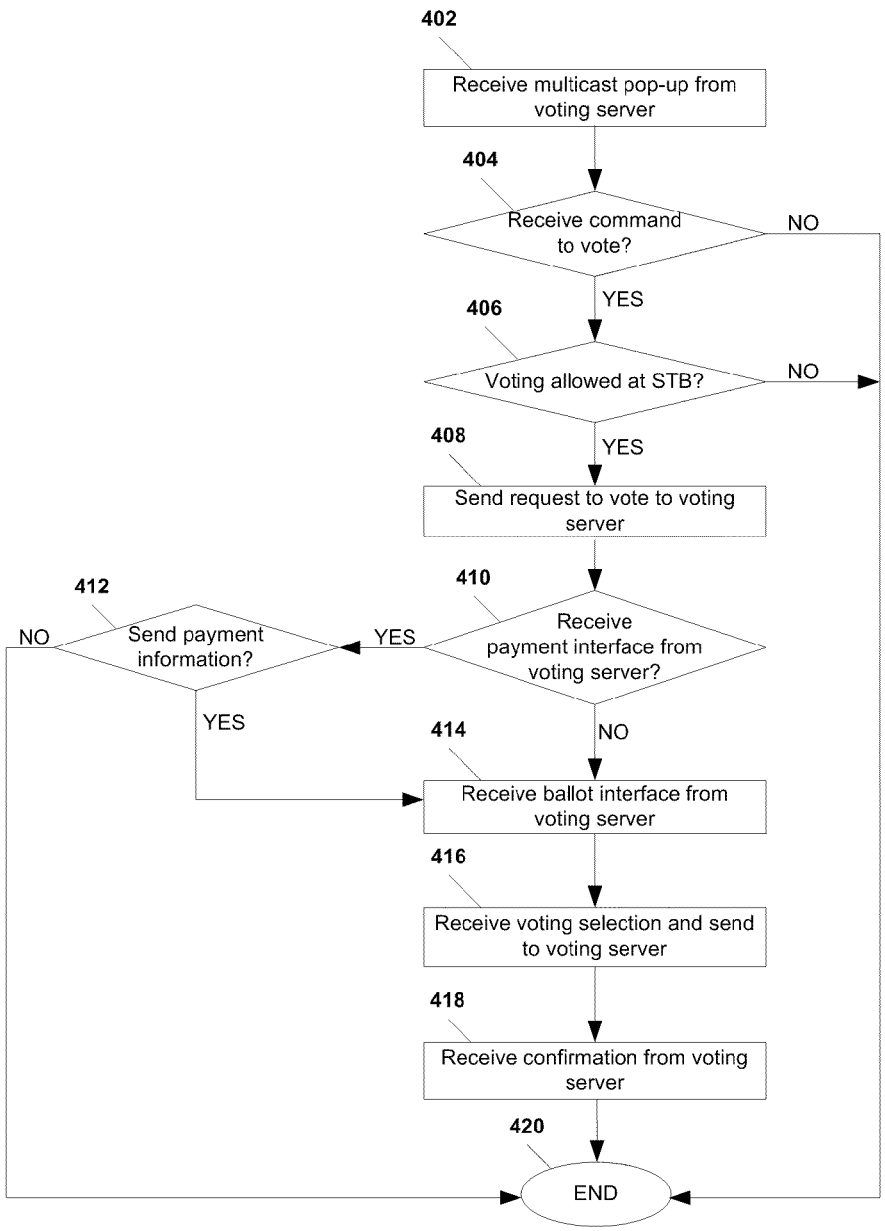
FIG. 4 is a flow diagram of a second particular illustrative embodiment of a method of voting via an interactive television system.

Referring to FIG. 4, a second particular illustrative embodiment of a method of voting via an interactive television system is illustrated. In a particular embodiment, a set-top box device can receive multicast video content of a channel from a voting server, video server, D-server, or any combination thereof, of an Internet Protocol Television Protocol (IPTV) system. At block 402, the set-top box device can receive multicast data related to a first graphical user interface (GUI), such as a pop-up interface, from the voting server. In an illustrative embodiment, the first GUI can include an instruction to select a particular key, or any key, of a remote control device to indicate a desire to cast a vote related to the video content. The set-top box device can send the first GUI to a display device coupled to the set-top box device. If no command to cast a vote is received at the set-top box device, the method can terminate at 420. Conversely, if a command to cast a vote is received at the set-top box device, the method proceeds to decision node 406.

At decision node 406, in an illustrative, non-limiting embodiment, the set-top box device can determine whether voting is allowed at the set-top box device. For instance, a user can select a preference or setting at the set-top box device that prohibits voting at the set-top box device, prohibits voters by certain users associated with the set-top box device, prohibits voting at the set-top box device without entering an authentication token, or any combination thereof. If the set-top box device determines that voting is not allowed at the set-top box device, or that voting by a user logged in at the set-top box device is not allowed, the method terminates at 420. On the other hand, if the set-top box device determines that voting is allowed, the method continues to block 408, and the set-top box device sends a request to cast a vote to the voting server.

Advancing to decision node 410, in an illustrative embodiment, the set-top box device can determine whether it has received data related to a payment interface from the voting server, indicating that payment is required to cast a vote related to the video content. If the set-top box device determines that it has not received data related to a payment interface, the method advances to block 414. Whereas, if the set-top box device determines that it has received data related to a payment interface, the method advances to decision node 412. At decision node 412, the set-top box device determines whether it has received a command to send payment information. For example, the set-top box device can send the payment interface to a display device coupled to the set-top box device. A user can interact with the payment interface to input payment information and can select a command to submit the payment information. If the set-top box device determines that it has received a command not to send payment information, the method terminates at 420. On the other hand, if the set-top box device determines that it has received a command to send payment information, the method proceeds to block 414.

At block 414, the set-top box receives data related to a third GUI, such as a ballot interface from the voting server. In a particular embodiment, where multiple set-top box devices have requested to cast a vote related to the video content, the voting server can multicast the data related to the third GUI to the set-top box device. For example, the third GUI can include interactive video content of a voting channel. Alternatively, the third GUI can overlay the video content to which voting is related. In an illustrative embodiment, the third GUI can include one or more selectable voting options, such as a single performer name, multiple performer names, a single polling option, multiple polling options (e.g., yes, no, more likely, less likely, for, against), or other selectable voting options. A user can interact with the third GUI, for example, via a remote control device communicating with the set-top box device to input a voting selection. At block 416, the set-top box device receives the voting selection from a user and sends the voting selection to the voting server. Continuing to block 418, in an illustrative embodiment, the set-top box device can receive a confirmation from the voting server indicating that the voting selection has been received. The method terminates at 420.

In a particular embodiment, the steps of the methods described herein can be executed in the order shown by the figures. In alternative embodiments, some steps can be executed simultaneously or in alternative sequences. For example, the voting server can send a payment interface after a ballot interface, the voting server can check voting status prior to sending the first GUI, etc.

Referring to FIG. 5, a particular illustrative embodiment of a graphical user interface (GUI) to vote via an interactive television system is illustrated and designated generally 500. In an illustrative embodiment, the GUI 500 can include a message 502 indicating that a particular key 504 of a remote control device 506 that communicates with a set-top box device 508 can be selected in order to cast a vote related to video content 510 shown on a display device 512 coupled to the set-top box device 508. In a particular embodiment, the key 504 can be one of a plurality of programmable smart keys of the remote control device 506.

Referring to FIG. 6, a second particular illustrative embodiment of a graphical user interface (GUI) to vote via an interactive television system is illustrated and designated generally 600. In an illustrative embodiment, the GUI 600 can include an indication 602 of the video content to which voting is related. In addition, the GUI 600 can include one or more selectable voting options 604. A user can input a voting selection by selecting one of the selectable voting options. In an illustrative, non-limiting embodiment, the user can input a voting selection by pressing a key corresponding to a key indicator 606 associated with one of the selectable voting options.

In conjunction with the configuration of structure described herein, the system and method disclosed provide voting via an interactive television system. In a particular illustrative embodiment, one or more set-top box devices can receive video content of a particular channel from a voting server or multicast video server of an Internet Protocol Television (IPTV) system. A voting server of the IPTV system can monitor the video content for triggers or other data indicating a voting event. When a voting event is indicated, the voting server can multicast to the set-top box devices an indicator of an option to cast a vote related to the video content. In a particular embodiment, the indicator can be a first graphical user interface (GUI) that includes an instruction to press a particular key, or any key, on a remote control device in order to cast a vote related to the video content. In an illustrative embodiment, the indicator can be a pop-up interface.

In a particular embodiment, a user can issue a command at a set-top box device indicating a selection to cast a vote related to the video content. In a particular embodiment, the command can be a selection of a particular key, or any key, on a remote control device. In response to the command, the set-top box device can send a request to vote to the voting server. The voting server can send to the set-top box device a voting interface, such as a second GUI, that includes one or more selectable voting options related to the video content. In one embodiment, the second GUI can include video content of a voting channel. In another embodiment, the second GUI can overlay video content to which voting is related. A user can enter a selection of a voting option via the voting interface, and the set-top box device can send the voting selection to the voting server. The voting server can add the selection of the voting option to a tally of votes related to the video content.

In a particular embodiment, the voting server can determine whether payment is required in order to cast a vote related to the video content. If the voting server determines that payment is required to cast a vote related to video content, the voting server can send to the set-top box device a payment interface, such as a third GUI, that allows a user to input payment information, such as a financial account number or other payment information.

In an illustrative embodiment, the voting server 182 can send a confirmation to the set-top box device indicating that a voting selection has been received at the voting server, that the voting selection has been added to the tally of votes, or any combination thereof. Further, in an illustrative non-limiting embodiment, the voting server can send a confirmation to one or more computing devices, Voice-over Internet Protocol (VoIP) phones, or other devices associated with the set-top box device.

In an illustrative embodiment, the voting server can transfer voting selections, tallies of voting selections, or any combination thereof, to servers, data stores, or other devices within or outside of the IPTV system. For example, the voting server can send tallies of votes to a data store or server associated with a television program, television channel, voting certification entity, or other party. In another example, the voting server can store tallies of votes as customer-wide polls.

Figure 7:
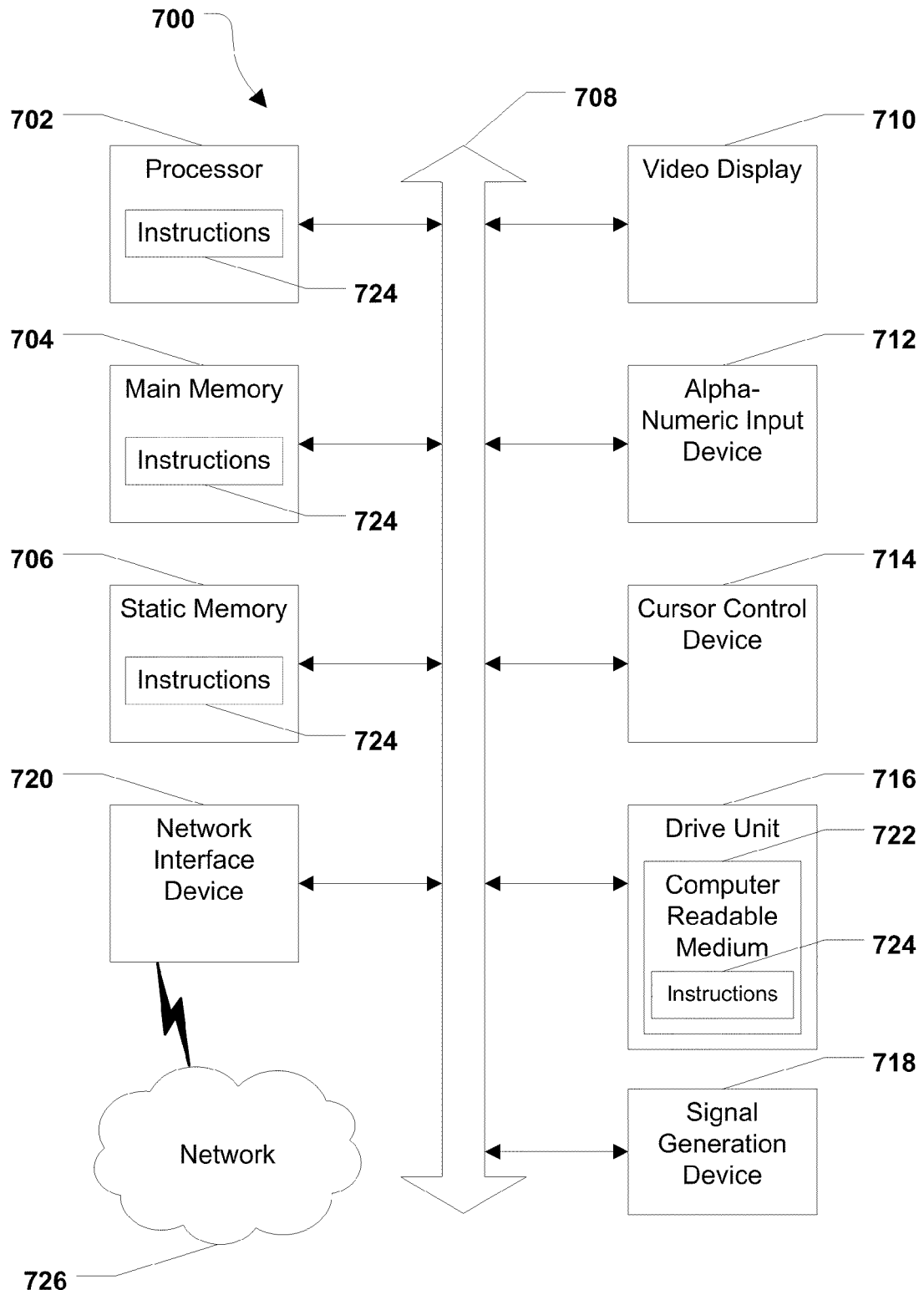
FIG. 7 is a diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices, including a server or set-top box device, as shown in FIGS. 1-2.

In a networked deployment, the computer system may operate in the capacity of an IPTV server, such as a multicast video server or voting server, or a set-top box device. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. Further, the computer system 700 can include a wireless input device 715, e.g., a remote control device. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a non-transitory tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. Accordingly, the disclosure is considered to include a non-transitory tangible storage medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP. MPEG, SMPTE, H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. A computer implemented method, comprising:
receiving, at a server of an internet protocol television network, a voting selection from a set-top box device, the voting selection associated with video content that is received at the set-top box device via the internet protocol television network;

not adding the voting selection to a tally of votes associated with the video content in response to determining that a voting status indicates that a previous vote was received from the set-top box device; and sending a message to the set-top box device from the server, the message indicating that the previous vote associated with the video content was received from the set-top box device;

wherein the video content is received via a client-facing tier switch disposed within a client-facing tier of the internet protocol television network, the client-facing tier having a first interface to an access network and a second interface switchably connected through a private network to an application tier, wherein the client-facing tier is coupled to the access network and provides the video content to the set-top box device.

2. The computer implemented method of claim 1, further comprising sending data associated with a voting interface from the server to the set top box device to receive the voting selection, the voting interface including a ballot interface, wherein the voting selection is one of a plurality of selectable voting selections included in the ballot interface.

3. The computer implemented method of claim 2, further comprising sending a payment interface from the server to the set-top box device to receive payment information when payment information is required to accept the voting selection.

4. The computer implemented method of claim 3, further comprising comparing the payment information to information stored at a billing server of the internet protocol television network, wherein the voting interface is sent to the set-top box device in response to determining that the payment information matches the stored information.

5. The computer implemented method of claim 3, further comprising establishing a secure connection with the set-top box device before sending the payment interface.

6. The computer implemented method of claim 1, further comprising:
adding, at the server, the voting selection to a tally of votes related to the video content in response to determining that the voting status indicates that a previous vote has not been received from the set-top box device; and
changing, at the server, the voting status to indicate that a vote has been received from the set-top box device after adding the voting selection to the tally of votes.

7. The computer implemented method of claim 1, further comprising sending a confirmation to the set-top box device from the server to indicate that the voting selection has been received.

8. A set-top box device, comprising:
a processor; and
a memory device coupled to the processor;
wherein the processor is configured to:
receive data related to a voting interface from a server of an internet protocol television network;
send the voting interface to a display device to receive user input from a remote control device associated with the set-top box device; and
send the user input to the server to cast a vote associated with video content that is received at the set-top box device via the internet protocol television network;
wherein the server stores a voting status associated with the set-top box device, wherein in response to determining that the voting status indicates that a previous vote was received from the set-top box device the server does not add the vote associated with the video content to a tally of votes, and wherein the set-top box device receives a message from the server, the message indicating that the previous vote associated with the video content was received from the set-top box device; and
wherein the video content is received via a client-facing tier switch disposed within a client-facing tier of the internet protocol television network, the client-facing tier having a first interface to an access network and a second interface switchably connected through a private network to an application tier, wherein the client-facing tier is coupled to the access network and provides the video content to the set-top box device.

9. The set-top box device of claim 8, wherein the processor is further configured to cease sending the voting interface to the display device when the user input is not received within a predetermined period of time.

10. The set-top box device of claim 8, wherein the processor is further configured to receive data associated with a payment interface from the server.

11. The set-top box device of claim 8, wherein the voting interface includes at least one user selectable voting option associated with the video content.

12. The set-top box device of claim 8, wherein the video content is received from a multicast server of the internet protocol television network.

13. A server, comprising:
a processor;
a non-transitory memory device comprising operational instructions that, when executed by the processor, cause the processor to:
receive a voting selection from a set-top box device, the voting selection associated with video content received at the set-top box device via an internet protocol television network;
not add the voting selection to a tally of votes associated with the video content in response to determining that a voting status indicates that a previous vote was received from the set-top box device; and
send a message to the set-top box device, the message indicating that the previous vote associated with the video content was received from the set-top box device;
wherein the video content is received via a client-facing tier switch disposed within a client-facing tier of the internet protocol television network, the client-facing tier having a first interface to an access network and a second interface switchable connected through a private network to an application tier, wherein the client-facing tier is coupled to the access network and provides the video content to the set-top box device.

14. The server of claim 13, wherein the operational instructions are further executable by the processor to transfer the tally of votes to a storage device.

15. The server of claim 13, wherein the operational instructions are further executable by the processor to send a payment interface from the server to the set-top box device to receive payment information.

16. The server of claim 15, wherein the operational instructions are further executable by the processor to compare the payment information to information stored at a billing server of the interne protocol television network, wherein a voting interface is sent to the set-top box device in response to determining that the payment information matches the stored information.

17. The server of claim 15, wherein the operational instructions are further executable by the processor to remove information identifying at least one of a set-top box device identifier and a user identifier from each voting selection before adding the voting selection to the tally of votes.

18. The server of claim 13, wherein the operational instructions are further executable by the processor to:

add, at the server, the voting selection to a tally of votes related to the video content in response to determining that a voting status indicates that a previous vote has not been received from the set-top box device; and change, at the server, the voting status to indicate that a vote has been received from the set-top box device after adding the voting selection to the tally of votes.

19. The server of claim 13, wherein the tally of votes includes at least one of a highest vote recipient and a range of voting recipients and their associated votes.

* * * * *